United States Patent
Nelson et al.

(10) Patent No.: US 9,478,137 B1
(45) Date of Patent: Oct. 25, 2016

(54) DETECTING AND COMMUNICATING LANE SPLITTING MANEUVER

(71) Applicant: Ford Global Technologies, LLC, Dearborn, MI (US)

(72) Inventors: Zachary David Nelson, Detroit, MI (US); Arthur Erik Zysk, Ferndale, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/741,591

(22) Filed: Jun. 17, 2015

(51) Int. Cl.
*G08G 1/16* (2006.01)
*G01S 17/88* (2006.01)
*G01S 15/88* (2006.01)
*B60Q 9/00* (2006.01)

(52) U.S. Cl.
CPC .............. *G08G 1/161* (2013.01); *B60Q 9/008* (2013.01); *G01S 15/88* (2013.01); *G01S 17/88* (2013.01)

(58) Field of Classification Search
CPC ...... G08G 1/161; B60Q 9/008; G01S 15/88; G01S 17/88
USPC ................. 340/432, 10.1–10.6, 572.1–572.9
See application file for complete search history.

(56) References Cited

U.S. PATENT DOCUMENTS

| | | | |
|---|---|---|---|
| 8,060,260 B2 | 11/2011 | Huang | |
| 2005/0273260 A1* | 12/2005 | Nishida | B60Q 1/34 701/301 |
| 2007/0164852 A1* | 7/2007 | Litkouhi | B60G 17/0195 340/435 |
| 2013/0116915 A1 | 5/2013 | Ferreira et al. | |
| 2013/0127638 A1 | 5/2013 | Harrison | |
| 2013/0242102 A1 | 9/2013 | Tsuchiya | |
| 2014/0236414 A1 | 8/2014 | Droz | |
| 2014/0358321 A1* | 12/2014 | Ibrahim | G01S 19/39 701/1 |
| 2015/0367778 A1* | 12/2015 | Vladimerou | G06K 9/00798 348/148 |

* cited by examiner

*Primary Examiner* — George Bugg
*Assistant Examiner* — Thang Tran
(74) *Attorney, Agent, or Firm* — Frank A. MacKenzie; Bejin Bieneman PLC

(57) ABSTRACT

A vehicle system includes a lane detector programmed to output a boundary signal representing a location of a lane boundary relative to a host vehicle. A processing device is programmed to determine, from the boundary signal, whether the host vehicle is performing a lane splitting maneuver. If so, the processing device is programmed to transmit a lane splitting signal.

20 Claims, 4 Drawing Sheets

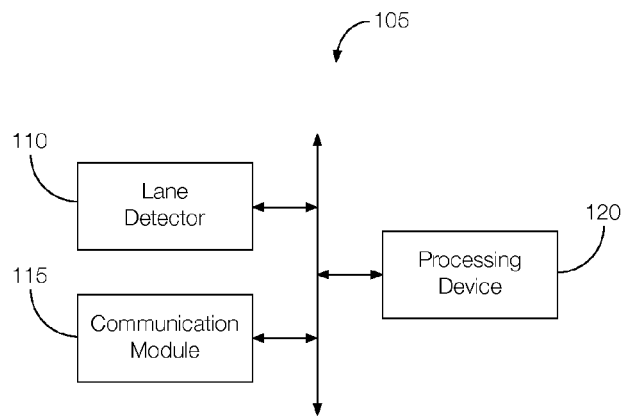
FIGURE 2
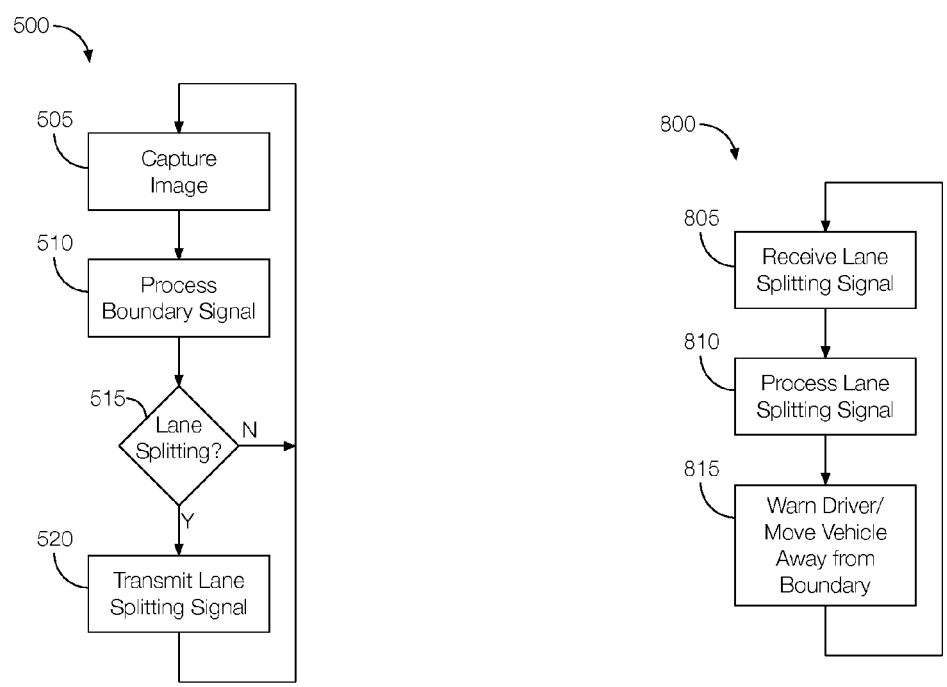
FIGURE 5
FIGURE 8

DETECTING AND COMMUNICATING LANE SPLITTING MANEUVER

BACKGROUND

Lane splitting occurs when, instead of driving in a lane, a motorcycle or bicycle travels along a lane boundary, typically between two lanes or between one lane and a shoulder or sidewalk. It occurs more often in high traffic areas such as on urban streets and freeways. While controversial, lane splitting can reduce traffic congestion by allowing motorcyclists and bicyclist to use otherwise vacant road space.

BRIEF DESCRIPTION OF THE DRAWINGS

FIG. 2 illustrates a block diagram of example components of the lane splitting notification system.

FIG. 5 is a flowchart of an example process that may be executed by the lane splitting notification system to notify nearby vehicles that the lane splitting maneuver is being performed.

FIG. 8 is a flowchart of an example process that may be executed by the communication system.

DETAILED DESCRIPTION

Performing a lane splitting maneuver often puts motorcycles and bicycles in an automobile's blind spot. Therefore, drivers must be diligent to make sure that a motorcycle or bicycle isn't lane splitting near the automobile when the automobile is changing lanes. One way to reduce the risk to motorcyclists or bicyclist during lane splitting maneuvers includes notifying automobile drivers when a nearby motorcycle or bicycle is lane splitting. An example system for providing such notifications includes a lane detector programmed to output a boundary signal representing a location of a lane boundary relative to a host vehicle (i.e., the lane splitting vehicle). A processing device is programmed to determine, from the boundary signal, whether the host vehicle is performing a lane splitting maneuver. If so, the processing device is programmed to transmit a lane splitting signal to, e.g., nearby vehicles.

The vehicles that receive and process the lane splitting signal may generate an alert to their respective drivers. The alert may make the drivers of the nearby vehicle aware of the lane splitting so that the drivers of the nearby vehicles will be more cautious. Moreover, the lane splitting signal may cause autonomous vehicles to provide more room for the lane splitting. That is, the autonomous vehicle may, in response to receiving the lane splitting signal, "hug" an opposite lane boundary or possibly change lanes in the opposite direction of the lane splitting.

The elements shown may take many different forms and include multiple and/or alternate components and facilities. The example components illustrated are not intended to be limiting. Indeed, additional or alternative components and/or implementations may be used.

Figure 1:
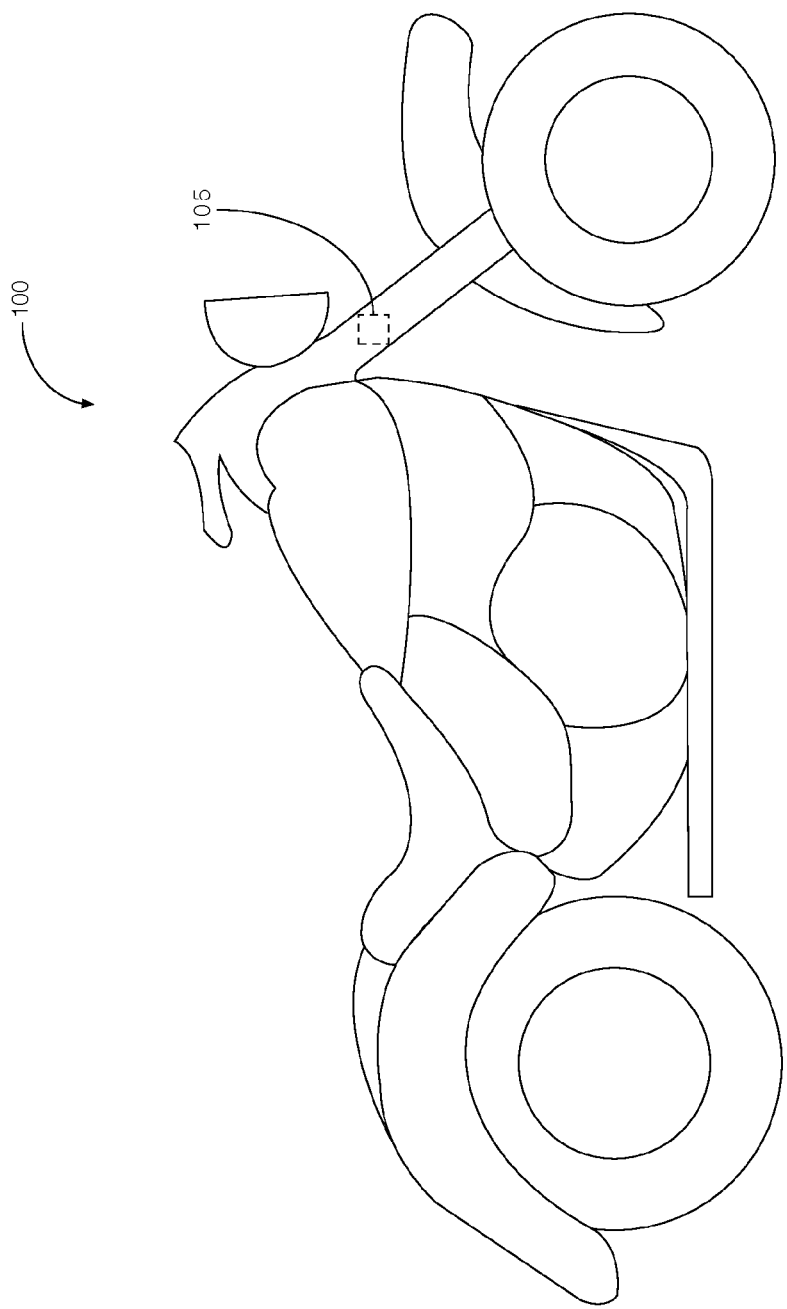
FIG. 1 illustrates an example vehicle with a lane splitting notification system for notifying nearby vehicles when a lane splitting maneuver is being performed.

FIG. 1 illustrates an example host vehicle 100 with a lane splitting notification system 105 that can notify nearby vehicles when the host vehicle 100 is performing a lane splitting maneuver. The lane splitting notification system 105 may determine whether the host vehicle 100 is performing a lane splitting maneuver from the location of a lane boundary relative to the host vehicle 100. In some instances, the lane splitting notification system 105 may transmit a lane splitting signal to nearby vehicles. The lane splitting signal may make drivers of nearby vehicles aware that the host vehicle 100 is performing a lane splitting maneuver. If the nearby vehicle is operating in an autonomous mode, the nearby vehicle may move to give the host vehicle 100 more room while lane splitting. Although shown as a motorcycle, the host vehicle 100 may include any vehicle small or narrow enough to perform a lane splitting maneuver. Examples may include a motorcycle, a bicycle, a scooter, a golf cart, etc.

Referring now to FIG. 2, the lane splitting notification system 105 may include a lane detector 110, a communication module 115, and a processing device 120.

The lane detector 110 may include any electronic device programmed to output a boundary signal representing the location of the lane boundary relative to the host vehicle 100. In some approaches, the lane detector 110 may be located, e.g., near a headlight of the host vehicle 100. In some instances, the lane detector 110 may include a camera configured to capture a video feed of an area ahead of the host vehicle 100. Alternatively, non-camera sensors, such as an ultrasound sensor, a navigation sensor (GPS), an infrared sensor, a LIDAR sensor, etc. may be used in addition or as an alternative to the camera. The area ahead of the host vehicle 100 may include one or more road surface markings including, e.g., lane boundaries such as lane dividers, a roadway center line, lane edge markings, or the like. Thus, the boundary signal may include the video feed or other data stream representing the area ahead of the host vehicle 100.

The communication module 115 may include any electronic device configured or programmed to facilitate wireless communication among the host vehicle 100 and other, nearby vehicles in accordance with, e.g., a vehicle-to-vehicle communication protocol. An example of a vehicle-to-vehicle communication protocol may include, e.g., the dedicated short range communication (DSRC) protocol. Accordingly, the communication module 115 may be programmed to receive messages from, or transmit messages to, other nearby vehicles. For instance, as discussed in greater detail below, the communication module 115 may be programmed to broadcast a lane splitting signal, indicating that the host vehicle 100 is lane splitting, to nearby vehicles.

The processing device 120 may include any electronic device programmed to receive the boundary signal and determine, from the boundary signal, whether the host vehicle 100 is performing a lane splitting maneuver. The processing device 120 may be programmed to process the boundary signal. Processing the boundary signal may include processing the video feed or other data stream captured by the lane detector 110 to determine where the lane markers are relative to the host vehicle 100.

The processing device 120 may compare the location of the lane boundary to a center axis 125 (see FIG. 3) of the host vehicle 100. The center axis 125 may be an imaginary line extending through a center of the host vehicle 100. The processing device 120 may determine that the host vehicle 100 is performing the lane splitting maneuver if the lane boundary is aligned with, or within a predetermined distance from, the center axis 125. The predetermined distance may be based on the overall width of the host vehicle 100. For instance, the predetermined distance may be, e.g., 50% of the width of the host vehicle 100, 25% of the width of the host vehicle 100, 10% of the width of the host vehicle 100, etc. Moreover, the host vehicle 100 may not travel exactly parallel to the lane boundary while lane splitting. Thus, the center axis 125 and lane boundary are likely to intersect. The processing device 120 may be programmed to identify the lane splitting maneuver if the center axis 125 intersects the lane boundary for a predetermined amount of time to, e.g., distinguish lane splitting from a lane change.

Alternatively, instead of comparing the location of the lane boundary to the center axis 125, the processing device 120 may be programmed to determine whether the lane boundary is between two imaginary, parallel lines 130 (see FIG. 4) extending along the length of the host vehicle 100. The distance between the parallel lines 130 may be based on the width of the host vehicle 100. For instance, the distance between the parallel lines 130 may be, e.g., 50% of the width of the host vehicle 100, 25% of the width of the host vehicle 100, 10% of the width of the host vehicle 100, etc. The processing device 120 may be programmed to generate the lane splitting signal in response to, e.g., the lane boundary intersecting one of the parallel lines 130 and remaining between the parallel lines 130 for a predetermined amount of time (e.g., to distinguish lane splitting from a simple lane change).

The processing device 120 may be programmed to generate and output a lane splitting signal if the processing device 120 determines that the host vehicle 100 is performing a lane splitting maneuver. The lane splitting signal may be transmitted to the communication module 115 with an instruction to broadcast the lane splitting signal to nearby vehicles. Vehicles that receive the lane splitting signal may notify their respective drivers that the host vehicle 100 is lane splitting. Nearby autonomous vehicles may, in response to receiving the lane splitting signal, move away from the lane boundary to give the host vehicle 100 more room to maneuver.

Figure 3:
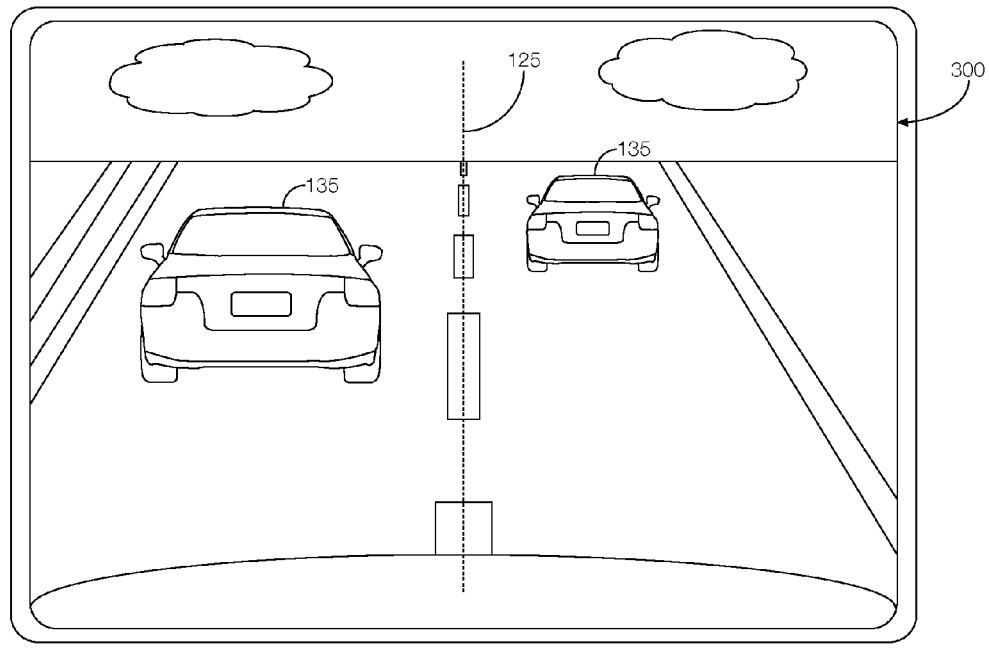
FIG. 3 is an example image captured by a lane detector incorporated into the lane splitting notification system.
Figure 4:
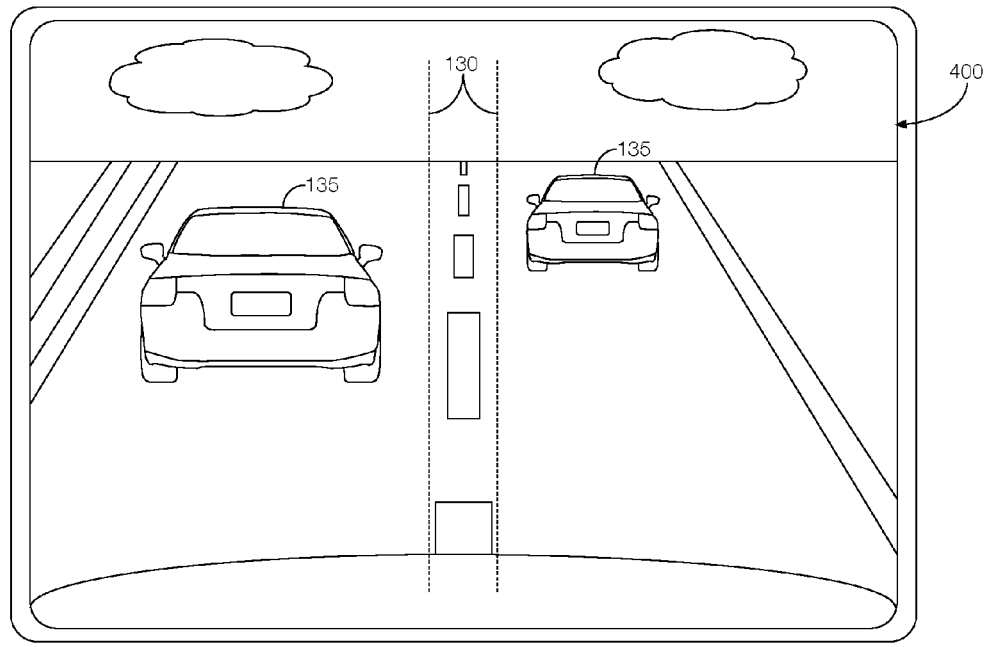
FIG. 4 is another example image captured by the lane detector.

FIGS. 3 and 4 are example images 300, 400 that may be processed by the lane splitting notification system 105 to determine whether to broadcast the lane splitting signal. The images 300, 400 may be captured by, e.g., a camera incorporated into the lane detector 110. Referring to FIG. 3, as discussed above, a center axis 125 extends through a center of the host vehicle 100. The lane boundary is within a predetermined distance from the center axis 125, so the processing device 120 may determine that the host vehicle 100 is lane splitting. As a result, the processing device 120 may generate the lane splitting signal and output the lane splitting signal to the communication module 115. The communication module 115 may broadcast the lane splitting signal to nearby vehicles. The lane boundary need not line up perfectly with the center axis 125. So long as the lane boundary is within a predetermined distance from the center axis 125, the processing device 120 may determine that the host vehicle 100 is lane splitting. Moreover, the host vehicle 100 need not travel exactly parallel to the lane boundary. Thus, the center axis 125 and lane boundary are likely to intersect. The processing device 120 may be programmed to identify the lane splitting maneuver if the center axis 125 intersects the lane boundary for a predetermined amount of time so that lane changes can be distinguished from lane splitting.

Referring now to FIG. 4, the center axis 125 has been replaced by parallel lines 130. When the lane boundary is between the parallel lines 130, the processing device 120 may generate the lane splitting signal and output the lane splitting signal to the communication module 115, which as discussed above may broadcast the lane splitting signal to nearby vehicles. The processing device 120, therefore, may be programmed to generate the lane splitting signal in response to, e.g., the lane boundary intersecting one of the parallel lines 130 and remaining between the parallel lines 130 for a predetermined amount of time (e.g., to distinguish lane splitting from a simple lane change).

FIG. 5 is a flowchart of an example process 500 that may be executed by the lane splitting notification system 105 to notify nearby vehicles that the lane splitting maneuver is being performed. The process 500 may be executed when the host vehicle 100 is turned on and may continue to execute until the host vehicle 100 is parked or otherwise no longer being driven.

At block 505, the lane splitting notification system 105 may capture an image of an area ahead of the host vehicle 100. The image may be captured by a lane detector 110 that includes, e.g., a camera. The lane detector 110 may generate a boundary signal representing the location of the lane boundary relative to the host vehicle 100, and the boundary signal may be transmitted to the processing device 120.

At block 510, the lane splitting notification system 105 may process the boundary signal. The processing device 120 may receive the boundary signal from the lane detector 110, and processing the boundary signal may include extracting the location of the lane boundary from the boundary signal and comparing the location of the lane boundary to a center axis 125 (see FIG. 3) of the host vehicle 100 or two parallel lines 130 (see FIG. 4) extending along a length of the host vehicle 100. By comparing the location of the lane boundary to the center axis 125 or parallel lines 130, the processing device 120 may determine whether the host vehicle 100 is lane splitting.

At decision block 515, the lane splitting notification system 105 may determine whether the host vehicle 100 is lane splitting. For instance, the processing device 120 may determine whether the host vehicle 100 is lane splitting based on, e.g., whether the lane boundary is aligned with or within a predetermined distance from the center axis 125 or if the lane boundary is between the parallel lines 130. Alternatively or in addition, the processing device 120 may determine that the host vehicle 100 is lane splitting if the lane boundary intersects the center line for a predetermined amount of time. If the processing device 120 determines that the host vehicle 100 is lane splitting, the process 500 may proceed to block 520. Otherwise, the process 500 may return to block 505.

At block 520, the lane splitting notification system 105 may generate and transmit the lane splitting signal. The processing device 120 may generate the lane splitting signal, indicating that the host vehicle 100 is performing a lane splitting maneuver, and transmit the lane splitting signal to the communication module 115 with an instruction to broadcast the lane splitting signal to nearby vehicles. The communication module 115 may transmit the lane splitting signal in accordance with a vehicle-to-vehicle communication protocol, such as the dedicated short range communication (DSRC) protocol. The process 500 may proceed to block 505 after the lane splitting signal has been broadcast.

Figure 6:
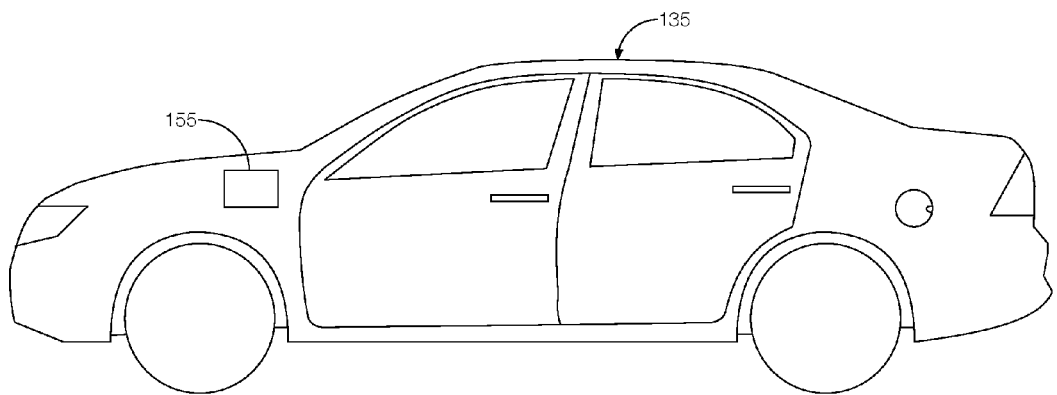
FIG. 6 illustrates an example vehicle with a communication system for receiving the notification transmitted by the lane splitting vehicle.

FIG. 6 illustrates an example nearby vehicle 135 (relative to the lane splitting vehicle) with a communication system 155 for receiving the lane splitting signal transmitted by the lane splitting vehicle (i.e., the host vehicle 100 discussed previously). In response to receiving the lane splitting signal, the communication system 155 may notify the driver of the nearby vehicle 135 that the lane splitting vehicle is performing a lane splitting maneuver. Notifying the driver may include illuminating a light in the passenger compartment or, e.g., on a side mirror on the side of the nearby vehicle 135 where the lane splitting vehicle is performing the lane splitting maneuver. In some instances, the communication system 155 may detect that the driver intends to move the nearby vehicle 135 into the path of the lane splitting vehicle. The driver's intention may be determined from, e.g., the driver actuating a turn signal level or through changes in the position of the nearby vehicle 135. In the case of an autonomous vehicle, the communication system 155 may output signals that would cause the nearby vehicle 135 to move away from the lane boundary, or possibly even change lanes, to give the lane splitting vehicle more room to perform the lane splitting maneuver.

Although illustrated as a sedan, the nearby vehicle 135 may include any passenger or commercial automobile such as a car, a truck, a sport utility vehicle, a crossover vehicle, a van, a minivan, a taxi, a bus, etc. In some possible approaches, as previously discussed, the nearby vehicle 135 is an autonomous vehicle configured to operate in an autonomous (e.g., driverless) mode, a partially autonomous mode, or a non-autonomous mode.

Figure 7:
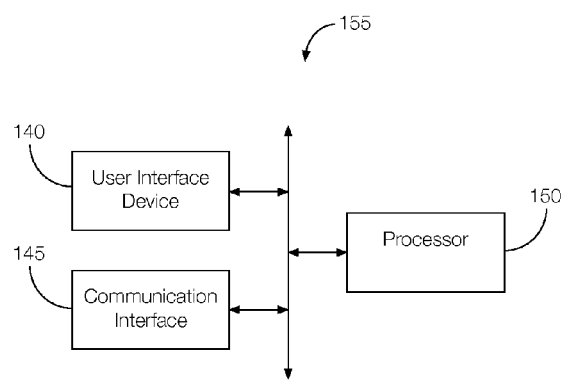
FIG. 7 is a block diagram of an example components that may be incorporated into the communication system of FIG. 6.

Referring now to FIG. 7, the communication system 155 incorporated into the nearby vehicles 135 may include a user interface device 140, a communication interface 145, and a processor 150. The user interface device 140 may include any electronic device programmed to present information to a user, such as a driver, during operation of the nearby vehicle 135. Moreover, the user interface device 140 may be programmed to receive user inputs. The user inputs may be received via real or virtual buttons. In some possible approaches, the user interface device 140 may include a touch-sensitive display screen. The communication interface 145 may include any electronic device programmed to facilitate wireless communication with other vehicles, such as the lane splitting vehicle, via, e.g., a vehicle-to-vehicle communication protocol. An example of a vehicle-to-vehicle communication protocol may include, e.g., the dedicated short range communication (DSRC) protocol. For instance, the communication interface 145 may be programmed to receive the lane splitting signal transmitted from the lane splitting vehicle via, e.g., the DSRC protocol. The processor 150 may include any electronic device programmed to process the lane splitting signal and take an appropriate measure. Examples may include illuminating a light to indicate that the lane splitting vehicle is lane splitting. The light may be located on a side mirror or on the user interface device 140, for example. In the case of autonomous operation, the processor 150 may output commands that cause the nearby vehicle 135 to move away from the lane boundary where the lane splitting vehicle is lane splitting.

FIG. 8 is a flowchart of an example process 800 that may be executed by the communication system 155. The process 800 may be executed while the nearby vehicle 135 is being operated and may continue to execute until the nearby vehicle 135 is parked.

At block 805, the nearby vehicle 135 may receive a lane splitting signal. The lane splitting signal may indicate that the lane splitting vehicle that transmitted the lane splitting signal is presently engaged in a lane splitting maneuver near the nearby vehicle 135. The lane splitting signal may be received via, e.g., the communication interface 145.

At block 810, the nearby vehicle 135 may process the lane splitting signal. The communication interface 145 may transmit the lane splitting signal to the processor 150 for processing.

At block 815, the nearby vehicle 135 may take an appropriate action in response to receiving the lane splitting signal. As discussed above, the action may include illuminating a light inside the passenger compartment or on a side mirror, or in the case of autonomous operation, guide the nearby vehicle 135 away from the lane boundary where the lane splitting vehicle is performing the lane splitting maneuver. The process 800 may return to block 805 after block 815.

In general, the computing systems and/or devices described may employ any of a number of computer operating systems, including, but by no means limited to, versions and/or varieties of the Ford Sync® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A vehicle system comprising:
   a lane detector programmed to output a boundary signal representing a location of a lane boundary relative to a host vehicle; and
   a processing device programmed to determine, from the boundary signal, whether the host vehicle is performing a lane splitting maneuver in response to detecting the host vehicle is overlapping the lane boundary, wherein the processing device is programmed to transmit a lane splitting signal if the processing device determines that the host vehicle is performing a lane splitting maneuver.

2. The vehicle system of claim 1, further comprising a communication module programmed to wirelessly broadcast the lane splitting signal to nearby vehicles.

3. The vehicle system of claim 1, wherein the lane detector includes at least one of a camera, an ultrasound sensor, a navigation sensor, a LIDAR sensor, and an infrared sensor.

4. The vehicle system of claim 3, wherein the boundary signal includes a data stream of an area ahead of the host vehicle.

5. The vehicle system of claim 4, wherein the processing device is programmed to process the data stream to determine whether the host vehicle is performing the lane splitting maneuver.

6. The vehicle system of claim 1, wherein the processing device is programmed to determine that the host vehicle is performing the lane splitting maneuver if the location of the lane boundary is aligned with a center axis of the host vehicle.

7. The vehicle system of claim 1, wherein the processing device is programmed to determine that the host vehicle is performing the lane splitting maneuver if the location of the lane boundary is within a predetermined distance of a center axis of the host vehicle.

8. The vehicle system of claim 7, wherein the predetermined distance includes at least 50% of a width of the host vehicle.

9. The vehicle system of claim 7, wherein the predetermined distance includes at least 25% of a width of the host vehicle.

10. The vehicle system of claim 7, wherein the predetermined distance includes at least 10% of a width of the host vehicle.

11. A method comprising:
    receiving a boundary signal representing a location of a lane boundary relative to a host vehicle;
    determining, from the boundary signal, whether the host vehicle is performing a lane splitting maneuver in response to detecting the host vehicle is overlapping the lane boundary; and
    transmitting a lane splitting signal if the host vehicle is performing a lane splitting maneuver.

12. The method of claim 11, wherein transmitting the lane splitting signal includes wirelessly broadcasting the lane splitting signal to nearby vehicles.

13. The method of claim 11, wherein determining whether the host vehicle is performing the lane splitting maneuver includes processing a data stream captured by a camera, wherein the data stream includes a video of an area ahead of the host vehicle.

14. The method of claim 11, wherein determining whether the host vehicle is performing the lane splitting maneuver includes determining whether the location of the lane boundary is aligned with a center axis of the host vehicle.

15. The method of claim 11, wherein determining whether that the host vehicle is performing the lane splitting maneuver includes determining whether the location of the lane boundary is within a predetermined distance of a center axis of the host vehicle.

16. The method of claim 15, wherein the predetermined distance includes at least 50% of a width of the host vehicle.

17. The method of claim 15, wherein the predetermined distance includes at least 25% of a width of the host vehicle.

18. The method of claim 15, wherein the predetermined distance includes at least 10% of a width of the host vehicle.

19. A vehicle system comprising:
a lane detector programmed to capture a data stream of an area ahead of a host vehicle and output a boundary signal representing a location of a lane boundary relative to the host vehicle;
a processing device programmed to determine, from the boundary signal, whether the host vehicle is performing a lane splitting maneuver based at least in part on whether a center axis of the host vehicle is overlapping the lane boundary, wherein the processing device is programmed to transmit a lane splitting signal if the processing device determines that the host vehicle is performing a lane splitting maneuver; and
a communication module programmed to wirelessly broadcast the lane splitting signal to nearby vehicles.

20. The vehicle system of claim 19, wherein at least one of the nearby vehicles includes a processor programmed to receive the lane splitting signal and output an alert indicating that the host vehicle is performing the lane splitting maneuver.

* * * * *